(12) United States Patent
Zheng et al.

(10) Patent No.: US 10,107,261 B2
(45) Date of Patent: Oct. 23, 2018

(54) SYSTEM AND METHOD FOR REDUCING OSCILLATION LOADS OF WIND TURBINE

(71) Applicants: General Electric Company, Schenectady, NY (US); Danian Zheng, Fairfield, CT (US); Xiongzhe Huang, Shanghai (CN); William Edwin Holley, Greer, SC (US); Conner B. Shane, Glenville, NY (US); Raveendra Penmatsa, Bangalore (IN); Jignesh Govindlal Gandhi, Simpsonville, SC (US); Timothy Botsford Cribbs, Roanoke, VA (US)

(72) Inventors: Danian Zheng, Fairfield, CT (US); Xiongzhe Huang, Shanghai (CN); William Edwin Holley, Greer, SC (US); Conner B. Shane, Glenville, NY (US); Raveendra Penmatsa, Bangalore (IN); Jignesh Govindlal Gandhi, Simpsonville, SC (US); Timothy Botsford Cribbs, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 15/101,001

(22) PCT Filed: Dec. 9, 2013

(86) PCT No.: PCT/CN2013/088885
§ 371 (c)(1),
(2) Date: Jun. 2, 2016

(87) PCT Pub. No.: WO2015/085465
PCT Pub. Date: Jun. 18, 2015

(65) Prior Publication Data
US 2016/0305403 A1 Oct. 20, 2016

(51) Int. Cl.
*G05D 7/00* (2006.01)
*F03D 7/02* (2006.01)
(Continued)

(52) U.S. Cl.
CPC ......... *F03D 7/0296* (2013.01); *F03D 7/0224* (2013.01); *F03D 7/042* (2013.01);
(Continued)

(58) Field of Classification Search
CPC . F03D 7/00; F03D 7/002; F03D 7/042; F03D 7/0296; F03D 7/02
See application file for complete search history.

(56) References Cited

U.S. PATENT DOCUMENTS

| 7,175,389 B2 | 2/2007 | Moroz |
| 7,281,891 B2 | 10/2007 | Smith et al. |

(Continued)

FOREIGN PATENT DOCUMENTS

| EP | 0847496 B1 | 8/2000 |
| EP | 1075600 B1 | 8/2002 |
| WO | WO9709531 A1 | 3/1997 |

OTHER PUBLICATIONS

Extended European Search Report and Opinion issued in connection with corresponding EP Application No. 13898996.7 dated Jul. 6, 2017.

(Continued)

Primary Examiner — Vincent Tran
(74) Attorney, Agent, or Firm — Dority & Manning, P.A.

(57) ABSTRACT

A system and method for reducing oscillation loads of a wind turbine induced by high turbulence and/or combined with other environmental conditions are provided. The method includes determining at least one wind parameter at the wind turbine; monitoring an operating condition of the wind turbine; determining, by a processor, a variance of at (Continued)

least one of the monitored operating condition or a plurality of the wind parameters, wherein the variance is indicative of an oscillation occurring at one or more wind turbine components; determining, by a processor, an operating set point based on the variance; and, operating the wind turbine based on the operating set point when the variance indicates that the oscillation has a frequency within a certain frequency band so as to modify the frequency, wherein the modified frequency is outside of the frequency band and reduces oscillation loads occurring at the one or more wind turbine components.

18 Claims, 5 Drawing Sheets

(51) Int. Cl.
  F03D 9/25        (2016.01)
  F03D 15/10       (2016.01)
  F03D 17/00       (2016.01)
  F03D 7/04        (2006.01)
  G05B 19/042      (2006.01)

(52) U.S. Cl.
  CPC .............. F03D 9/25 (2016.05); F03D 15/10 (2016.05); F03D 17/00 (2016.05); G05B 19/042 (2013.01); F05B 2270/334 (2013.01); G05B 2219/2619 (2013.01); Y02E 10/723 (2013.01)

(56) References Cited

U.S. PATENT DOCUMENTS

| | | | |
|---|---|---|---|
| 7,342,323 B2 | 3/2008 | Avagliano et al. | |
| 7,346,462 B2 | 3/2008 | Delmerico | |
| 7,400,055 B2 | 7/2008 | Nagao | |
| 7,476,985 B2 | 1/2009 | Gonzalez | |
| 7,505,833 B2 | 3/2009 | Delmerico et al. | |
| 7,573,149 B2 | 8/2009 | Kammer et al. | |
| 7,586,205 B2 | 9/2009 | Krueger | |
| 7,613,548 B2 | 11/2009 | Cardinal et al. | |
| 7,629,702 B2 | 12/2009 | Schubert | |
| 7,772,713 B2 | 8/2010 | Huang et al. | |
| 7,822,560 B2 | 10/2010 | LeMieux | |
| 7,861,583 B2 | 1/2011 | Honhoff et al. | |
| 7,942,629 B2 | 5/2011 | Shi et al. | |
| 7,979,167 B2 | 7/2011 | Delmerico et al. | |
| 8,025,476 B2 | 9/2011 | Zheng et al. | |
| 8,050,887 B2 | 11/2011 | Ahmann | |
| 8,123,478 B2 | 2/2012 | Ahmann | |
| 8,169,098 B2* | 5/2012 | Scholte-Wassink | F03D 7/0296 290/44 |
| 8,202,048 B2 | 6/2012 | Stiesdal et al. | |
| 8,257,040 B2 | 9/2012 | Chen et al. | |
| 8,816,871 B2* | 8/2014 | Drossel | F03D 17/00 290/44 |
| 2006/0066111 A1 | 3/2006 | Suryanarayanan et al. | |
| 2007/0114799 A1* | 5/2007 | Riesberg | F03D 13/20 290/55 |
| 2008/0164091 A1* | 7/2008 | Kerber | F03D 7/0296 181/211 |
| 2009/0142178 A1* | 6/2009 | Nieuwenhuizen | E04H 12/085 415/2.1 |
| 2009/0218818 A1 | 9/2009 | Cardinal et al. | |
| 2010/0158687 A1 | 6/2010 | Dawson et al. | |
| 2011/0076142 A1* | 3/2011 | Veldkamp | F03D 7/0224 416/1 |
| 2011/0135475 A1* | 6/2011 | Ahmann | F03D 7/0224 416/61 |
| 2011/0140425 A1 | 6/2011 | Staedler | |
| 2011/0204636 A1 | 8/2011 | Scholte-Wassink et al. | |
| 2013/0033040 A1 | 2/2013 | Bowyer et al. | |
| 2013/0167624 A1 | 7/2013 | Shoda | |
| 2013/0287568 A1 | 10/2013 | Miranda | |
| 2015/0003984 A1* | 1/2015 | Pineda Amo | F03D 7/0296 416/1 |

OTHER PUBLICATIONS

International Search Report of PCT/CN2013/088885 dated Sep. 9, 2014.

* cited by examiner

SYSTEM AND METHOD FOR REDUCING OSCILLATION LOADS OF WIND TURBINE

FIELD OF THE INVENTION

The present subject matter relates generally to wind turbines and, more particularly, to a system and method for reducing oscillation loads in a wind turbine induced by high turbulence and/or combined with other environmental conditions.

BACKGROUND OF THE INVENTION

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is geared to a generator for producing electricity.

During initial start-up of a wind turbine, oscillations occur in various wind turbine components as the generator speed is increased to rated speed. The oscillations of the individual components have a tendency to excite the wind turbine when the frequency of the oscillations equals one of the resonance frequencies of the wind turbine, which is the frequency at which the response amplitude is a relative maximum. As used herein, the term "resonance" is meant to encompass the tendency of a wind turbine component to oscillate with greater amplitude at some frequencies than at others and/or a vibration of large amplitude produced by a relatively small vibration near the same frequency of vibration as the natural frequency of the resonating system or band of frequencies. In addition, the resonance may be due to the coupling effect of the tower with the pitch drive mechanism and/or the coupling effect of the tower with the speed regulator. At such frequencies, even small periodic excitation actions can produce large amplitude oscillations, because the component is capable of storing vibrational energy.

As such, various control technologies have been implemented to control the generator speed of the wind turbine during start-up to avoid components from oscillating at one of their resonance frequencies. For example, various control technologies determine a speed exclusion zone for the generator and prevent the generator speed from operating in this zone for longer than a predetermined time period to avoid exciting the system. The speed exclusion zone of a wind turbine typically refers to a region within the variable-speed region of the wind turbine where the generator is not allowed to operation for sustained periods. Such control strategies, however, are typically only concerned with start-up conditions of the wind turbine and do not consider oscillations caused by high turbulence intensity and/or other environmental conditions combined with wind turbine operational status that occur during subsequent operation.

For example, as wind speeds vary and create turbulence on the wind turbine, the generator speed correspondingly varies and can excite resonance frequencies of various wind turbine components, thereby causing oscillation and/or resonance loads that can damage the wind turbine. More specifically, the rotor blades tend to experience edgewise oscillations or vibrations and/or resonance behavior at high turbulence that increases the blade-edge loads above design loads. Rotor blade edge-wise oscillations occur in the chord-wise direction of the rotor blade between the leading edge and the trailing edge and can damage the blade due to little damping directed to such oscillations.

Further control strategies reduce and/or prevent various wind turbine component loading by shutting down the wind turbine above a certain (cut out) wind speed in an effort to minimize loads. Though this strategy prevents damaging loads that might occur due to the higher turbulence in the wind, a disadvantage is the lack of energy capture in the region above the cut out wind speed. Also, a brief increase in wind speed might trigger a turbine shutdown, while the recovery to normal power production may take some time. On the same token, the occurrence of high turbulence at rated wind speeds will also increase the likelihood of triggering a turbine shutdown. Still further control technologies reduce and/or prevent various wind turbine component loading by measuring a wind speed via a sensor and implementing a control a control action when wind speeds indicate turbulent conditions. Such strategies, however, do not consider resonance and/or oscillation loads as described herein.

Accordingly, an improved system and method for reducing oscillation loads of a wind turbine due to high turbulence and/or combined with other environmental conditions would be desired in the art.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for reducing oscillation loads of a wind turbine due to high turbulence or combined with other environmental conditions. The method includes determining at least one wind parameter at the wind turbine; monitoring an operating condition of the wind turbine; determining, by a processor, a variance of at least one of the monitored operating condition or a plurality of the wind parameters, wherein the variance is indicative of an oscillation occurring at a wind turbine component; determining, by a processor, an operating set point based on the variance; and, operating the wind turbine based on the operating set point when the variance indicates that the oscillation has a frequency within a certain frequency band so as to modify the frequency, wherein the modified frequency is outside of the frequency band and reduces oscillation loads occurring at the one or more wind turbine components.

In another embodiment, the frequency band may include one of a predetermined frequency band or a computed frequency band. In still further embodiments, the frequency band may include one or more resonance frequencies of the one or more wind turbine components. In a further embodiment, the wind turbine component may include a rotor blade of the wind turbine, wherein the variance may be indicative of a blade-edge oscillation or a flap-wise oscillation. In another embodiment, the wind parameter may be reflective of any one of the following: a wind gust, a wind speed, a wind direction, a wind acceleration, a wind turbulence, a wind shear, a wind veer, a wake, or similar. In still another embodiment, the step of determining the at least one wind parameter at the wind turbine may further include utilizing one or more sensors to measure the at least one wind parameter. In addition, the step of determining the at least one wind parameter may include estimating the wind parameter utilizing any combination of the following: one or more operating conditions of the wind turbine, a plurality of equations, one or more aerodynamic performance maps, one or more look-up tables (LUTs), one or more adaptive parameters of the wind turbine and/or derivations from any form of rotor/generator speed that is calculated or derived with respect to the pitch angles and/or the generator flux. The adaptive parameters of the wind turbine may be any changing parameter of the wind turbine, including, but not limited to previous operating experience, historical data, adaptive inputs, coefficients, gains, losses, constants, or similar.

In still another embodiment, the step of determining the at least one wind parameter may further include filtering a plurality of wind parameters to more accurately determine the wind parameter. In addition, the step of filtering the plurality of wind parameters to more accurately determine the wind parameter may further include utilizing a low-pass filter, a band-pass filter, or any other suitable filter.

In various embodiments, the operating conditions may be any of the following: a pitch angle/speed, rotor/generator speed, a power output, a torque/generator flux measurement output, or similar. In yet another embodiment, the method may include determining a standard deviation of the plurality of operating conditions, and determining the variance based, at least in part, on the standard deviation. Further, the method may include utilizing a filter to stabilize the standard deviation of the plurality of operating conditions.

In additional embodiments, the step of determining the operating set point based the variance may further include considering the electrical capability of the wind turbine, wherein the electrical capability of the wind turbine is a function of at least a torque availability of the wind turbine. In still further embodiments, the method may include inputting the operating set point into either a filter or an S-function to stabilize a transition to the operating set point.

In yet another embodiment, the step of operating the wind turbine based on the operating set point further includes at least one of de-rating or up-rating the wind turbine. In addition, the step of de-rating or up-rating the wind turbine may further include modifying any one of or a combination of the following: a generator speed, a torque demand and/or speed, a pitch angle of a rotor blade, a power output, an orientation of a nacelle of the wind turbine, a load bank, a buck boost mechanism, actuating one or more airflow modifying elements, and/or similar.

In another aspect, a method for reducing oscillation loads of a wind turbine due to high turbulence or combined with other environmental conditions is disclosed. The method includes monitoring a generator speed of the wind turbine; determining, by a processor, a generator speed variance from a plurality of monitored generator speeds, wherein the variance is indicative of an oscillation occurring at one or more wind turbine components; determining, by the processor, an operating set point based on the variance; and, operating the wind turbine based on the operating set point when the variance of the plurality of generator speeds indicates that the oscillation has a frequency within a certain frequency band so as to modify the frequency, wherein the modified frequency is outside of the frequency band and reduces oscillation loads occurring at the one or more wind turbine components induced by high turbulence intensity.

In still another aspect, the present subject matter is directed to a system for reducing oscillation loads in a wind turbine due to high turbulence or combined with other environmental conditions. The system includes a processor and a controller communicatively coupled to the processor. The processor is configured to: determine at least one wind parameter at the wind turbine, monitor an operating condition of the wind turbine, determine a variance of at least one of the monitored operating condition or a plurality of the wind parameters, wherein the variance is indicative of an oscillation occurring in one or more wind turbine components, and determine an operating set point based the variance. The controller is configured to operate the wind turbine based on the operating set point when the variance indicates the oscillation has a frequency within a certain frequency band so as to modify the frequency, wherein the modified frequency is outside of the frequency band and reduces oscillation loads occurring at the one or more wind turbine components.

In another embodiment of the system, the frequency band may include one or more resonance frequencies of the one or more wind turbine components. In addition, the one or more wind turbine components may be a rotor blade of the wind turbine, wherein the variance is indicative of a blade-edge oscillation and/or a flap oscillation, or similar.

In a further embodiment, the system may further include one or more sensors configured to measure one or more wind parameters and/or the operating conditions. In yet another embodiment, the processor may further include one or more low-pass filters configured to filter any of the following: a plurality of measured and/or estimated wind parameters and/or one or more operating set points. In still additional embodiments, the processor may further include one or S-functions, wherein the operating set point is an input for the S-function such that the S-function is configured to stabilize a transition to the operating set point. The system may also be configured to implement any of the steps of the method as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for reducing oscillation loads of a wind turbine due to high turbulence and/or combined with other environmental conditions. The environmental conditions can be any environmental condition that causes an oscillation on one or more wind turbine components, including, wind peaks, wind shear, changes in wind direction, air density, and/or similar. As such, the present disclosure allows the wind turbine to continue to operate at higher cut-out wind speeds under high turbulence intensity levels. More specifically, the present subject matter is configured to detect or infer an oscillation occurring at a wind turbine component, e.g. a rotor blade, by determining a wind speed and corresponding generator speed and determining a variance in either the wind speed and/or the generator speed. As used herein, the terms "oscillate" or "oscillations" are meant to encompass any back-and-forth, up-and-down, and/or side-to-side movements of a wind turbine component including, but not limited to, any movements due to tower shadow, tower dam, wind shear, and/or turbulence intensity. In addition, the oscillations may also encompass any form of direct and/or indirect measurement by one or more sensors (e.g. accelerometers and/or gauges) that can be mounted in the wind turbine.

If the variance indicates that the oscillation of the wind turbine component has a frequency within a certain frequency band, e.g. a frequency at or near one or more resonance frequencies, the system is capable of modifying the frequency such that the modified frequency is no longer within the frequency band so as to prevent oscillation loads from damaging the wind turbine component. In one embodiment, for example, the present disclosure utilizes a combination of estimated and/or real wind speed and generator speed/wind speed variance to de-rate or up-rate the wind turbine (e.g. by adjusting the generator speed, torque speed, or both) to avoid edge-wise blade resonance and reduce blade edge loads. In addition, the de-rate/up-rate may consider the electrical capability of the wind turbine such that a modified operating set point, e.g. a torque demand and/or a generator speed demand, is actually achievable. In addition, the present disclosure may utilize a series of low pass filters and S-functions to make transitioning to a selected operating set point smooth and stable.

The various embodiments of the system and method described herein provide numerous advantages. For example, the present disclosure reduces and/or prevents oscillation loads induced by high turbulence intensity from damaging the wind turbine, while also increasing the cut-out wind speed to help customers secure a higher Annual Energy Production (AEP). Further, the present disclosure may be implemented using existing components of the wind turbine. As such, a user is not required to purchase, install, and maintain new equipment. Moreover, the system may be integrated with a broader control system, such as, but not limiting of, a wind turbine control system, a plant control system, a remote monitoring system, or combinations thereof.

Figure 1:
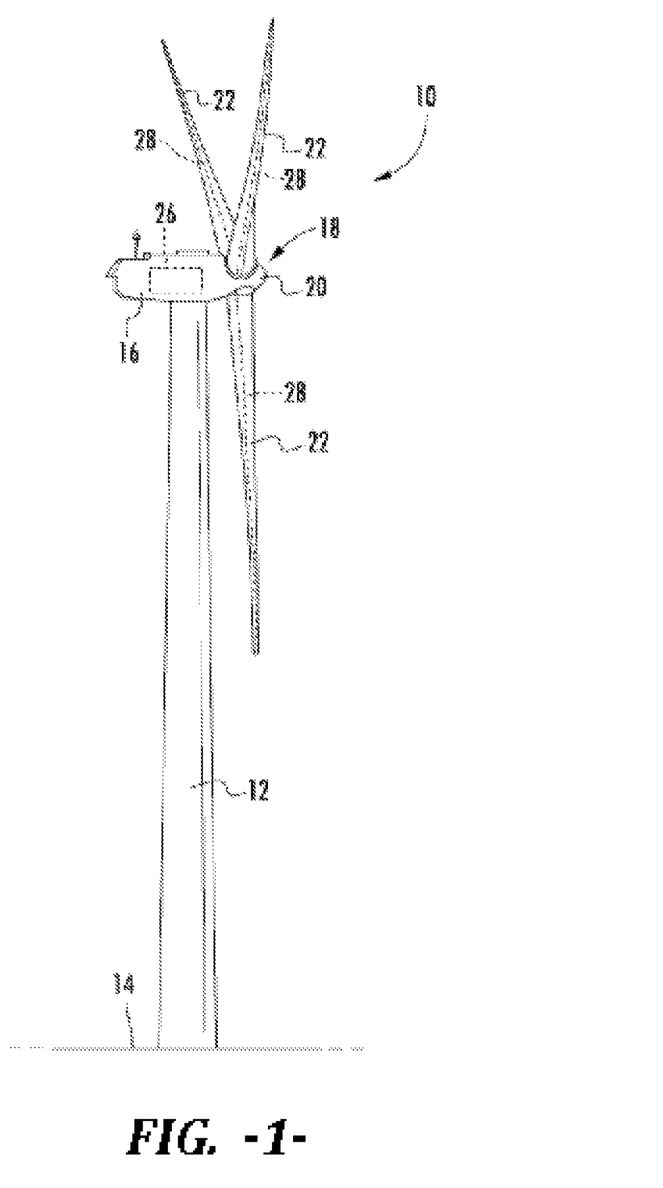
FIG. 1 illustrates a perspective view of one embodiment of a wind turbine according to the present disclosure.

Referring now to the drawings, FIG. 1 illustrates a perspective view of one embodiment of a wind turbine 10 that may implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to operate such components and/or to implement the steps of the present disclosure as described herein. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rate or up-rate the wind turbine, control various components of the wind turbine 10, and/or implement the various steps of the method described herein as will be discussed in more detail below.

Figure 2:
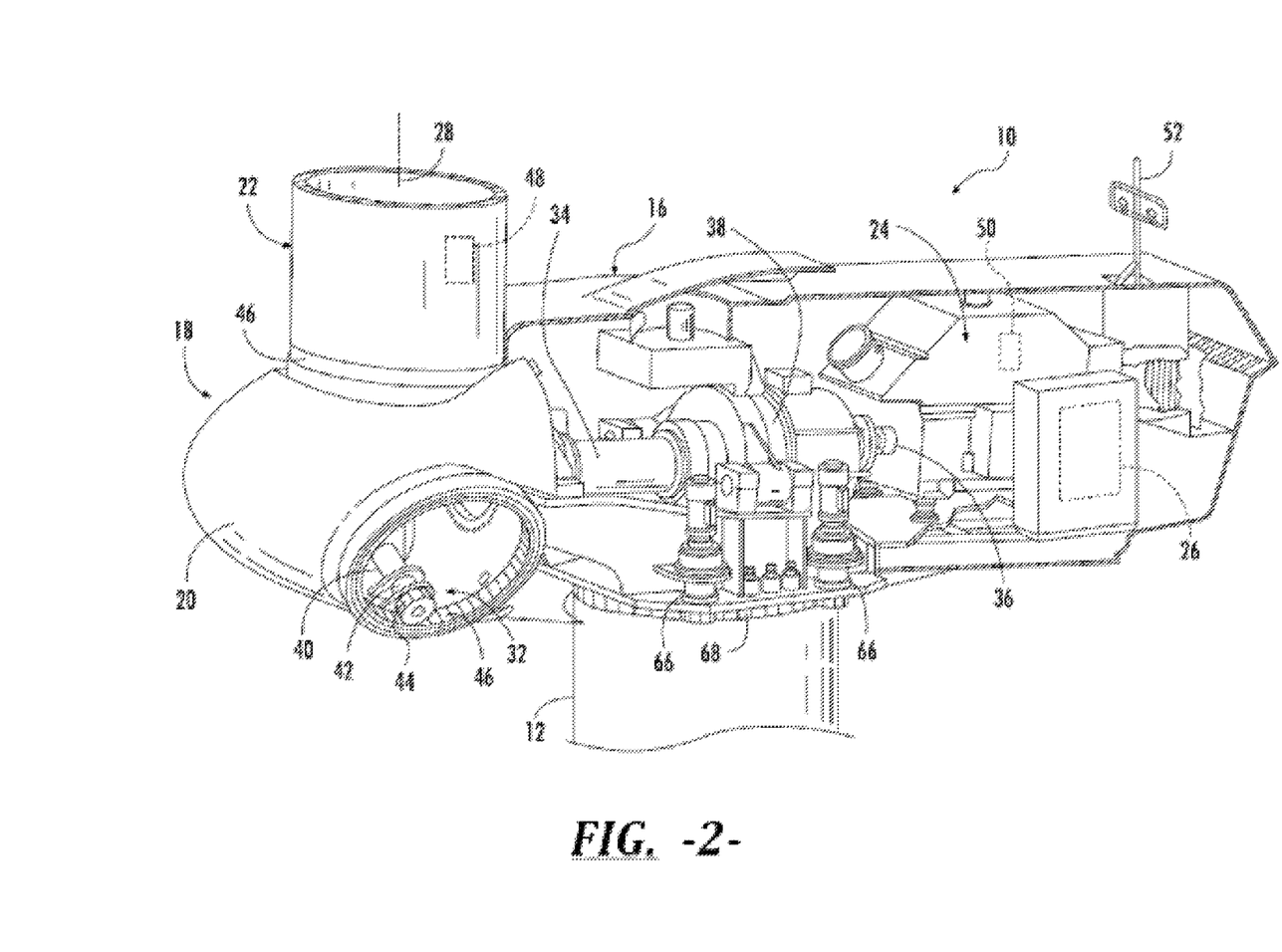
FIG. 2 illustrates an internal view of one embodiment of a nacelle of a wind turbine according to the present disclosure.

Referring now to FIG. 2, an internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24. The wind turbine 10 may also include a converter (not shown) configured to connect the generator 24 to the grid and to ensure a constant energy supply. More specifically, the converter is configured to convert a predetermined torque demand into rotational power to drive the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Still referring to FIG. 2, the wind turbine 10 may also include one or more sensors 48, 50, 52 configured to measure or monitor various wind parameters and/or one or more operating conditions of the wind turbine 10. For example, in various embodiments, the sensors may include blade sensors 48 for measuring a pitch angle of one of the rotor blades 22; generator sensors 50 for monitoring the generator 24 (e.g. torque, rotational speed, acceleration and/or the power output); and/or various wind sensors 52 for measuring various wind parameters, such as wind speed, wind peaks, wind turbulence, wind shear, changes in wind direction, air density, or similar. It should also be understood that any number or type of sensors may be employed and at any location. For example, the sensors may be Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should also be appreciated that, as used herein, the term "monitor" and variations thereof indicates that the various sensors may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter.

Figure 3:
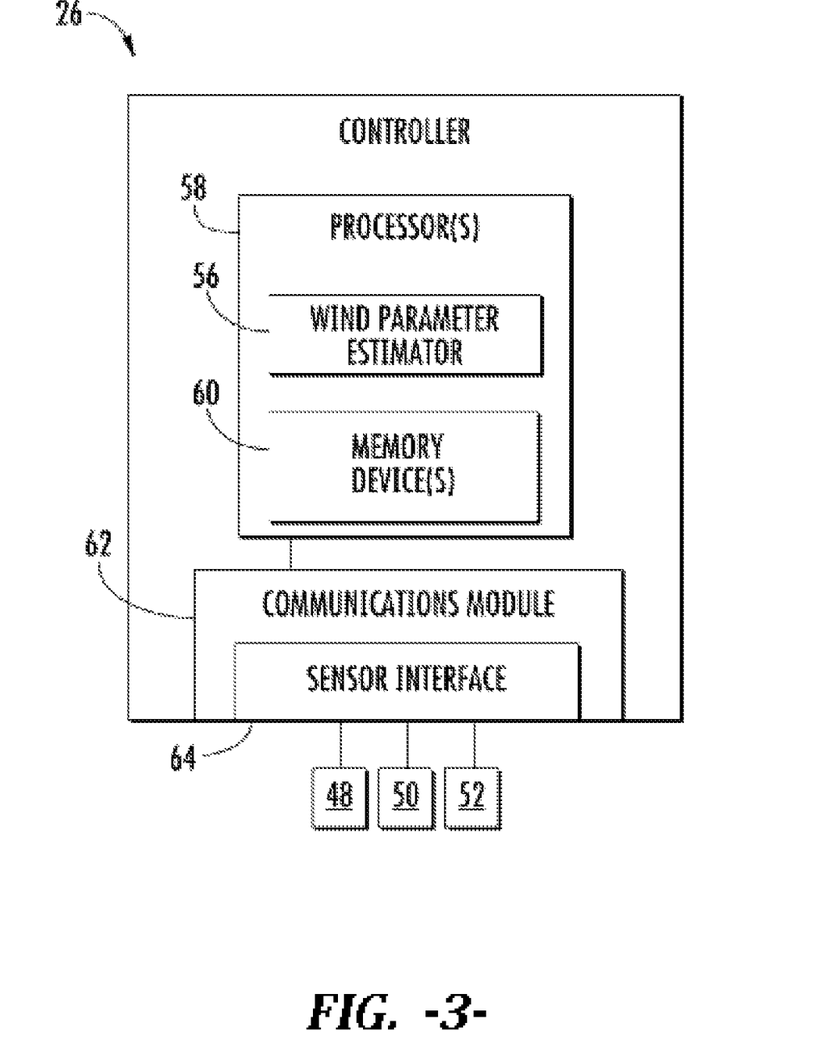
FIG. 3 illustrates a schematic diagram of one embodiment of a controller according to the present disclosure.
Figure 4:
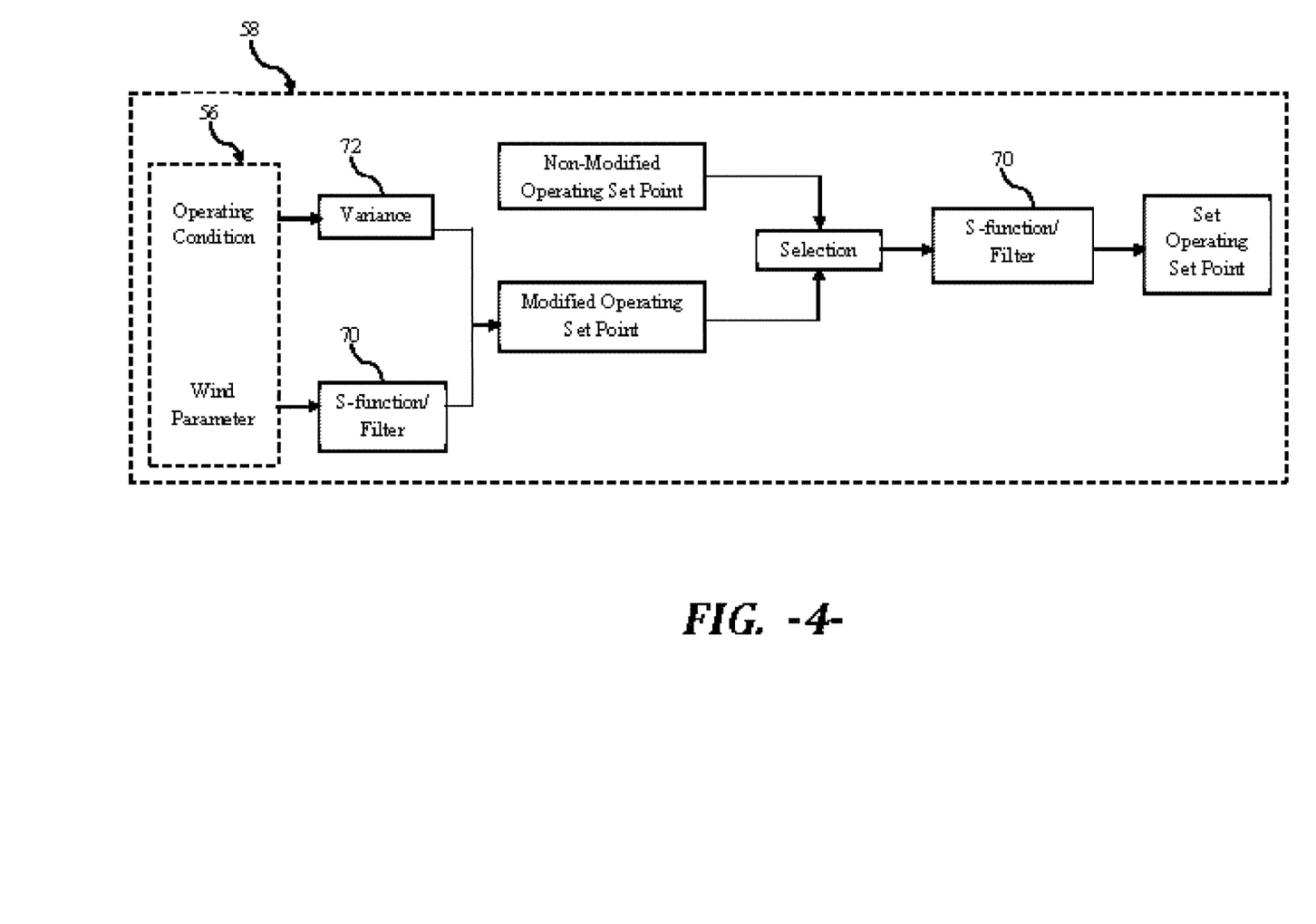
FIG. 4 illustrates a schematic diagram of one embodiment of a processor according to the present disclosure; and, FIG. 5 illustrates a flow diagram of a method according to the present disclosure.

Referring now to FIGS. 3 and 4, there are illustrated block diagrams of various embodiments of the controller 26 and the processor 58 according to the present disclosure. As shown in FIG. 3, the controller 26 may include one or more processor(s) 58, a wind parameter estimator 56, and associated memory device(s) 60 configured to perform a variety of computer-implemented functions (e.g., performing the methods, steps, calculations and the like and storing relevant data as disclosed herein). In further embodiments, the one or more processor(s) 58 may operate independently from the controller 56. Additionally, the controller 26 may include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50, 52 to be converted into signals that can be understood and processed by the processors 58. It should be appreciated that the sensors 48, 50, 52 may be communicatively coupled to the communications module 62 using any suitable means. For example, as shown in FIG. 3, the sensors 48, 50, 52 are coupled to the sensor interface 64 via a wired connection. However, in other embodiments, the sensors 48, 50, 52 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more wind parameters of the wind turbine 10, determining and selecting an appropriate operational set point for various wind turbine components, transmitting suitable control signals to implement control actions to prevent loads from damaging the wind turbine, and/or various other suitable computer-implemented functions. In addition, the wind parameter estimator 56 may be considered software that utilizes a plurality of operating conditions to calculate, in real-time, the current wind parameter. Further, the wind parameter estimator 56 may comprise firmware that includes the software, which may be executed by the processor 58. Further, the wind parameter estimator 56 may be in communication the various sensors and devices of the wind turbine 10.

Referring still to FIG. 3, in one embodiment, the processor 58 may receive one or more signals from the sensors 48, 50, 52 that are representative of one or more wind parameters or one or more operating conditions of the wind turbine 10. The wind parameters may be reflective of a wind gust, a wind speed, a wind direction, a wind acceleration, a wind turbulence, a wind shear, a wind veer, a wake, or similar. Alternatively, the wind parameter estimator 56 may estimate the wind parameter(s) as a function of various operating data. The operating data may include any one or combination of the following: a pitch angle, a generator speed, a power output, a torque demand and/or speed, a tip speed ratio, a rotor speed, or similar. Accordingly, the wind parameter estimator 56 is configured to implement a control algorithm having a series of equations to determine the estimated wind parameter. As such, the equations are solved using the operating data and/or conditions, one or more aerodynamic performance maps, one or more look-up tables (LUTs), or any combination thereof.

Referring now to FIG. 4, a schematic diagram to further illustrate the functionality of the processor 58 according to the present disclosure is illustrated. As mentioned, the processor 58 determines at least one real or estimated wind parameter at the wind turbine 10. In one embodiment, one or more filters or S-functions (labeled 70) may be utilized to improve the stability of the measured and/or estimated wind parameters due to high variations in the measured and/or estimated values. In one embodiment, for example, the filter 70 may be a low-pass filter. In another embodiment, the filter 70 may be a band-pass filter. In additional embodiments, the filter 70 may be any other suitable filter known in the art. The low-pass filter filters the high frequency signals from the plurality of wind parameters, thereby providing more reliable data. In addition, the low-pass filter as described herein may be a filter that passes low-frequency signals but attenuates (i.e. reduces the amplitude of) signals with frequencies lower than a cutoff frequency. In further embodiments, the low-pass filter may be used in conjunction with a high-pass filter. Further, any number of low-pass filters or high-pass filters may be used in accordance with the present disclosure. As such, the high-pass filter may pass high-frequency signals but attenuate signals with frequencies lower than a cutoff frequency. The high-frequency signals may be then subtracted from the raw signal such that only the low-frequency signals remain.

In addition or alternatively, the processor 58 may input the filtered or unfiltered wind parameters into an S-function 70 to provide a more accurate parameter estimation. In one embodiment, the S-function 70 is a mathematical equation having an S-shape. For example, in one embodiment, the S-function 70 may be represented by: $y=k/(1+a*exp(b*x))$, wherein k, a, and b are parameters of the S-curve, x is the input, and y is the output. It should be understood by those skilled in the art that the S-function 70 may also be any other suitable mathematical function, e.g. a Sigmoid function. In addition, the processor 58 may include any other suitable algorithm or function.

The processor 58 is also configured to determine a variance 72 of the monitored operating condition and/or the wind parameters, wherein the variance is indicative of an oscillation occurring in one or more wind turbine components. For example, in one embodiment, the sensors 48, 50, 52 are configured to monitor the operating condition, e.g. a fluctuating generator speed, and store the monitored operating condition in one or more memory device(s) 60. If the variance 72 of the operation condition indicates that the oscillation is within a certain frequency band, e.g. a range of frequencies including one or more resonance frequencies of one of the wind components, then the processor 58 is configured to de-tune or modify the frequency of the oscillation such that it is outside of the frequency band. In one embodiment, the frequency band can be a predetermined frequency band. For example, the predetermined frequency band may include a range of frequencies determined by Design of Experiment (DOE). Further, the predetermined frequency band may be a computed frequency band having manual or automated perturbation test results. Alternatively, the frequency band can be dynamically computed by performing automated perturbation tests and analyzing the test results based on the data collected.

In addition, the variance 72 generally refers to the up-and-down adjustments to the generator speed due to up-and-down wind speeds experienced by the wind turbine 10. In another embodiment, the variance 72 may be the up-and-down measurements or estimates of the high wind speed. The varying "high" wind speeds typically refer to wind speeds above 15 meters/second (m/s) and are indicative of a high turbulence intensity. Typical "high" turbulence intensity levels range from about 5% to about 20% for the wind turbine. It should be understood; however, that "high" wind speeds and "high" turbulence intensity as described herein are illustrative terms and are not meant to limit the present disclosure in any manner. Further, even though the average wind speed may remain within design limits, such up-and-down adjustments to the generator speed and/or up-and-down measured or estimated wind speed tend to excite resonance frequencies in various wind turbine components. As such, even relatively small periodic changes in the generator speed and/or wind speed can produce large amplitude oscillations in the various wind turbine components, thereby causing damage. For example, in one embodiment, the resonance frequency causes edge-wise loads in the rotor blade 22. As mentioned, edge-wise loads are loads in the chord-wise direction between the leading edge and the trailing edge and extend in the rotor plane. Flap-wise loads are perpendicular to edge-wise loads and extend out of the rotor plane. Edge-wise loads are typically higher than flap-wise loads because there is more material in the edge-wise direction. It should also be understood that a resonance frequency or vibrational energy may be found in any other wind turbine component and is not limited to the rotor blades 22.

In still further embodiments, the processor 58 may also calculate a standard deviation of the monitored operation condition as part of determining the variance 72. For example, in one embodiment, the sensors 48, 50, 52 may monitor or measure the operating condition and send corresponding signals to the processor 58, which is capable of storing the monitored operating condition over a predetermined time period in one or more memory device(s) 60. As such, the processor 58 can be configured to calculate the standard deviation of the monitored operating condition. The standard deviation as described herein indicates the variation or dispersion that exists from an average (mean) or expected value. In additional embodiments, any other calculated value indicative of a variability of the monitored operation conditions may be used.

In addition, the processor 58 may include one or more adaptive filters to smooth and stabilize the standard deviation calculation of the monitored operating condition to improve system stability. For example, the one or more adaptive filters can be any type of filter capable of accommodating to the changing conditions of the system, such as time constants, gain, and/or similar. For example, the one or more filters may be low-pass filters, high-pass filters, band-pass filters, or any other suitable filters known in the art. As such, the variance 72 may be determined from the operating condition sensor data, from the calculated standard deviation of the monitored operating condition, or a combination thereof.

Still referring to FIG. 4, the processor 58 is also configured to determine a modified operating set point based the variance 72 of the monitored operating condition and/or the real or estimated wind parameters. In a further embodiment, the processor 58 is configured to select between the modified operating set point and a current operating set point when the variance 72 indicates that the oscillation occurring in the wind turbine component is with a certain frequency band that can potentially damage the component, such as a range including the resonance frequency of the component. The current or non-modified operating set point is meant to encompass any suitable set point set by the controller 26 for operating the wind turbine 10 in normal wind and operational conditions (i.e. the variance 72 is not indicative of an oscillation having a frequency within the frequency band). As such, if the variance 72 indicates that the oscillation has a frequency with the frequency band, the controller 26 can change the operating set point to modify the frequency of the oscillation to a modified frequency that is outside of the frequency band so as to reduce oscillation loads on the wind turbine 10 induced by high turbulence intensity. If such oscillation loads are not detected, the controller 26 may continue operation in its current state. In additional embodiments, the processor 58 may be configured to input the operating set point into a filter, an S-function, or both, which are configured to smooth and stabilize the transition to the modified operating set point.

In various embodiments, the operating set point may also take into consideration an electrical capability of the wind turbine 10. As used herein, the term "electrical capability" of the wind turbine 10 is meant to encompass the amount of electricity that the wind turbine 10 is capable of producing. As such, the present system and method limits the operating set point such that it is electrically achievable. The electrical capability of the wind turbine 10 may be a function of, at least, the torque availability as determined by the converter of the wind turbine 10. In other words, the available torque that drives the generator 24 and produces electricity is limited by the currents and voltages supplied by the converter. As such, the torque availability cannot be increased arbitrarily because it is limited by the converter. Accordingly, the present disclosure is capable of determining the torque availability or torque limit and prohibiting the wind turbine 10 from operating above such limit.

In view of the variance 72 and/or the operating set point, the controller 26 may operate the wind turbine 10 by implementing any suitable control action. It should be understood that the control action as described herein may encompass any suitable command or constraint by the controller 26. For example, in several embodiments, the control action may include temporarily de-rating or up-rating the wind turbine 10 to modify the frequency of oscillations of one or more wind turbine components, thereby preventing oscillation loads from damaging the components. Further, de-rating and up-rating of the wind turbine 10 is a function of wind speed. As such, the adjustments made to de-rate or up-rate the wind turbine 10 during high wind speeds have a greater effect at decreasing loads than at lower wind speeds.

Up-rating the wind turbine, such as by up-rating torque, generator speed, or both, may temporarily increase power output of the wind turbine 10 wherein wind speeds indicate benign or non-turbulent conditions. Similarly, de-rating the wind turbine may include de-rating generator speed, torque, or a combination of both. In further embodiments, the wind turbine 10 may be de-rated by pitching one or more of the rotor blades 22 about its pitch axis 28. More specifically, the controller 26 may generally control each pitch adjustment mechanism 32 in order to alter the pitch angle of each rotor blade 22 between 0 degrees (i.e., a power position of the rotor blade 22) and 90 degrees (i.e., a feathered position of the rotor blade 22). As such, in one embodiment, the controller 26 may command a new pitch set point (e.g. from 0 degrees to 5 degrees), whereas in another embodiment, the controller 26 may specify a new pitch constraint (e.g. a constraint to ensure that subsequent pitch commands are at least 5 degrees).

In still another embodiment, the wind turbine 10 may be temporarily de-rated or up-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the converter in order to modulate the magnetic flux produced within the generator 24.

The wind turbine 10 may also be temporarily de-rated by yawing the nacelle 22 to change the angle of the nacelle 16 relative to the direction of the wind. In further embodiments, the controller 26 may be configured to actuate one or more mechanical brake(s) in order to reduce the rotational speed of the rotor blades 22, thereby reducing component loading. In still further embodiments, the controller 26 may modify a load bank and/or a buck boost mechanism. In yet another embodiment, the controller 26 may actuate one or more airflow modifying elements, such as one or more blade flaps, vortex generators, add-ons, and/or similar. the controller 26 may be configured to perform any appropriate control action known in the art. Further, the controller 26 may implement a combination of two or more control actions.

Figure 5:
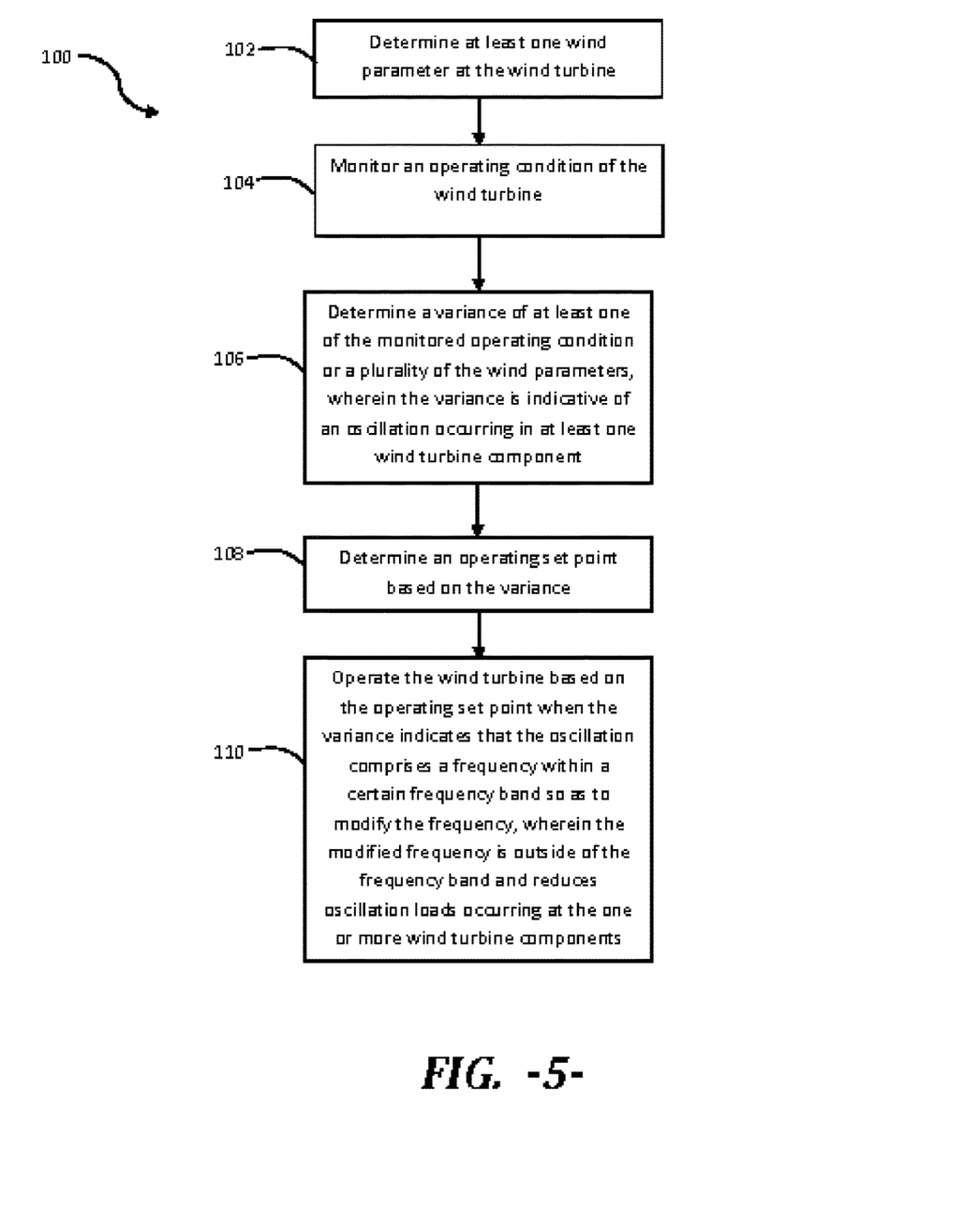

Referring now to FIG. 5, a flow diagram of method 100 for reducing oscillation loads in a wind turbine due to high turbulence or combined with other environmental conditions according to one embodiment of the present disclosure is illustrated. As shown, the method 100 includes a first step 102 of determining at least one wind parameter at the wind turbine, e.g. a wind speed. A next step 104 includes monitoring an operating condition of the wind turbine, e.g. a fluctuating generator speed. In addition, the method 100 may also include a step 106 of determining, by a processor, a variance of at least one of the monitored operating condition or a plurality of the wind parameters, wherein the variance is indicative of an oscillation occurring in one or more wind turbine components. In a next step, the method 100 includes determining, by a processor, an operating set point based on the variance (step 108). The method 100 may also include operating the wind turbine based on the operating set point when the variance indicates that the oscillation has a frequency within a certain frequency band so as to modify the frequency, wherein the modified frequency is outside of the frequency band and reduces oscillation loads occurring at the one or more wind turbine components induced by high turbulence intensity. (step 110).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing oscillation loads of a wind turbine induced by high turbulence or combined with other environmental conditions, the method comprising:

determining at least one wind parameter at the wind turbine;

monitoring an operating condition of the wind turbine;

determining, by a processor, a variance of at least one of the monitored operating condition or a plurality of the wind parameters, wherein the variance is indicative of an oscillation occurring at one or more wind turbine components;

determining, by the processor, an operating set point based on the variance and an electrical capability of the wind turbine, the electrical capability of the wind turbine being a function of at least a torque availability of the wind turbine; and, operating the wind turbine based on the operating set point when the variance indicates that the oscillation comprises a frequency within a certain frequency band so as to modify the frequency, wherein the modified frequency is outside of the frequency band and reduces oscillation loads occurring at the one or more wind turbine components.

2. The method of claim 1, wherein the frequency band comprises one of a predetermined frequency band or a computed frequency band.

3. The method of claim 1, wherein the frequency band comprises one or more resonance frequencies of the one or more wind turbine components.

4. The method of claim 1, wherein the one or more wind turbine components comprise a rotor blade of the wind turbine, and wherein the variance is indicative of one of a blade-edge oscillation or a blade-flap oscillation.

5. The method of claim 1, wherein the at least one wind parameter is reflective of any one of or combination of the following: a wind gust, a wind speed, a wind direction, a wind acceleration, a wind turbulence, a wind shear, a wind veer, or a wake.

6. The method of claim 1, wherein the step of determining the at least one wind parameter at the wind turbine further comprises at least one of the following: utilizing one or more sensors to measure the wind parameter or estimating the wind parameter, wherein estimating the wind parameter comprises one of or combination of the following: one or more operating conditions of the wind turbine, a plurality of equations, one or more aerodynamic performance maps, one or more look-up tables, or one or more adaptive parameters of the wind turbine.

7. The method of claim 1, wherein the step of determining the at least one wind parameter further comprises filtering the plurality of wind parameters.

8. The method of claim 7, wherein the step of filtering the plurality of wind parameters further comprises utilizing one of or a combination of a low-pass filter, a high-pass filter, or a band-pass filter.

9. The method of claim 1, wherein the monitored operating condition comprises any one of or a combination of the following: a pitch angle, a generator speed, a power output, or a torque output.

10. The method of claim 1, further comprising determining a standard deviation of the monitored operating condition, and determining the variance of the monitored operating condition based at least partially on the standard deviation.

11. The method of claim 10, further comprising utilizing a filter to stabilize the standard deviation of the monitored operating condition.

12. The method of claim 1, further comprising inputting the operating set point into one of a filter or an S-function to stabilize a transition to the operating set point.

13. The method of claim 1, wherein the step of operating the wind turbine based on the operating set point further comprises at least one of de-rating or up-rating the wind turbine, wherein de-rating or up-rating the wind turbine further comprises modifying one of or a combination of a generator speed, a torque demand, a pitch angle of a rotor blade, a power output, an orientation of a nacelle of the wind turbine, a load bank, a buck-boost mechanism, or actuating one or more airflow modifying elements.

14. A method for reducing oscillation loads of a wind turbine induced by high turbulence or combined with other environmental conditions, the method comprising:
monitoring a generator speed of the wind turbine;
determining, by a processor, a generator speed variance from a plurality of monitored generator speeds, wherein the generator speed variance is indicative of an oscillation occurring at one or more wind turbine components;
determining, by the processor, an operating set point based on the variance of the plurality of monitored generator speeds and an electrical capability of the wind turbine, the electrical capability of the wind turbine being a function of at least a torque availability of the wind turbine;
operating the wind turbine based on the operating set point when the variance indicates that the oscillation comprises a frequency within a certain frequency band so as to modify the frequency of the oscillation, wherein the modified frequency is outside of the frequency band and reduces oscillation loads occurring at the one or more wind turbine components.

15. A system for reducing oscillation loads of a wind turbine induced by high turbulence or combined with other environmental conditions, the system comprising:
a processor configured to:
determine at least one wind parameter at the wind turbine,
monitor an operating condition of the wind turbine;
determine a variance of at least one of the monitored operating condition or a plurality of the wind parameters, wherein the variance is indicative of an oscillation occurring at one or more wind turbine components;
determine an operating set point based on the variance and an electrical capability of the wind turbine, the electrical capability of the wind turbine being a function of at least a torque availability of the wind turbine; and,
a controller communicatively coupled to the processor, wherein the controller is configured to operate the wind turbine based on the operating set point when the variance indicates that the oscillation comprises a frequency within a certain frequency band so as to modify the frequency, wherein the modified frequency is outside of the frequency band and reduces oscillation loads occurring at the one or more wind turbine components.

16. The system of claim 15, wherein the frequency band comprises one or more resonance frequencies of the one or more wind turbine components.

17. The system of claim 15, wherein the one or more wind turbine components comprise a rotor blade of the wind turbine, and wherein the variance is indicative of one of a blade-edge oscillation or a blade-flap oscillation.

18. The system of claim 15, wherein the processor further comprises at least one low-pass filter or S-function, wherein the at least low-pass filter or S-function function is configured to stabilize any of the following: a plurality of measured or estimated wind parameters, the monitored operating condition, or one or more operating set points.

* * * * *